(12) United States Patent
Kilaas

(10) Patent No.: US 9,638,024 B2
(45) Date of Patent: May 2, 2017

(54) EARLY VERIFICATION OF A PRODUCTION WELL

(75) Inventor: Lars Kilaas, Trondheim (NO)

(73) Assignee: RESMAN AS, Ranheim (NO)

( * ) Notice: Subject to any disclaimer, the term of this patent is extended or adjusted under 35 U.S.C. 154(b) by 662 days.

(21) Appl. No.: 13/530,417

(22) Filed: Jun. 22, 2012

(65) Prior Publication Data

US 2012/0325464 A1 Dec. 27, 2012

Related U.S. Application Data

(60) Provisional application No. 61/501,393, filed on Jun. 27, 2011.

(30) Foreign Application Priority Data

Jun. 24, 2011 (NO) .................................... 20110912

(51) Int. Cl.
*E21B 47/10* (2012.01)
*C09K 8/03* (2006.01)
*C09K 8/52* (2006.01)

(52) U.S. Cl.
CPC ............ *E21B 47/1015* (2013.01); *C09K 8/03* (2013.01); *C09K 8/52* (2013.01)

(58) Field of Classification Search
CPC .................................................. E21B 47/1015
USPC ............................ 73/1.24; 166/250.12, 252.6
See application file for complete search history.

(56) References Cited

U.S. PATENT DOCUMENTS

| | | | | |
|---|---|---|---|---|
| 6,331,436 B1 * | 12/2001 | Richardson | ........... | G01N 33/241 |
| | | | | 436/27 |
| 7,560,690 B2 * | 7/2009 | Stray | .......... | C09K 8/03 |
| | | | | 250/303 |
| 8,596,354 B2 * | 12/2013 | Hartshorne | ........ | E21B 47/1015 |
| | | | | 166/250.12 |
| 2001/0036667 A1 * | 11/2001 | Tayebi | ................ | E21B 47/1015 |
| | | | | 436/56 |
| 2005/0109087 A1 | 5/2005 | Robb | | |
| 2006/0144588 A1 * | 7/2006 | Ferguson | ............ | E21B 47/1015 |
| | | | | 166/252.6 |
| 2010/0101411 A1 * | 4/2010 | Tipler | .................... | G01N 30/20 |
| | | | | 95/86 |
| 2010/0307745 A1 * | 12/2010 | Lafitte | ...................... | C09K 8/62 |
| | | | | 166/250.12 |
| 2011/0146974 A1 | 6/2011 | Hartshorne | | |

FOREIGN PATENT DOCUMENTS

WO  01/81914  11/2001

OTHER PUBLICATIONS

Patent Examination Report No. 1 issued Jun. 20, 2016 in Australian Application No. 2012273534.
International Search Report issued Feb. 7, 2013 in corresponding International (PCT) Application No. PCT/NO2012/050117.
International Search Report issued Feb. 14, 2012 in corresponding Norwegian Application No. 20110912.
Norwegian Search Report issued Jan. 24, 2012 in corresponding Norwegian Application No. 20110912.
Fridtjof Nyhavn et al., "*Permanent Tracers Embedded in Downhole Polymers Prove Their Monitoring Capabilities in a Hot Offshore Well*", SPE Annual Technical Conference and Exhibition 2010 (ATCE 2010), Florence, Italy Sep. 20-22, 2010, Curran, Red Hook, NY, vol. 5 of 7, No. SPE 135070, Sep. 19, 2010, pp. 1-15, XP002666456.
Bakhshi, A., et al., Using Chemical Tracers for Flow Profiling a Subsea Horizontal Well with an Open Hole Gravel Pack Lower Completion: Field Results. SPE 116914, Oct. 20, 2008.

* cited by examiner

*Primary Examiner* — Angela M DiTrani
(74) *Attorney, Agent, or Firm* — Wenderoth, Lind & Ponack, L.L.P.

(57) ABSTRACT

A method for a rapid verification of satisfactory clean-up at the end of the completion process when starting production of petroleum fluids while the completion rig is still at the well. The method includes marking one or more of separated zones along the well by one or more distinct tracers, before starting production. The tracers are added along with the completion or the clean-up fluid, and the tracers are arranged to be released by relative high concentrations from each zone to an inflowing fluid of oil or gas.

12 Claims, No Drawings

EARLY VERIFICATION OF A PRODUCTION WELL

This application claims the benefit of U.S. Provisional Application No. 61/501,393, filed Jun. 27, 2011.

BACKGROUND OF THE INVENTION

1. Technical Field

The present invention is a method for a rapid verification of satisfactory clean-up at the end of the completion process when starting production of petroleum fluids while the completion rig is still at the well location. More specifically, the method concerns marking of fluids by one or more distinct tracers, in one or more separate zones along the well, before start up of the production, followed by registration of back produced tracers to determine whether all the completion fluid has been back produced and if possible determine which well zones are participating to the production in this early production stage. If the verification is positive the well is satisfactory cleaned up and the completion rig may be removed. If the verification is negative and the problems are identified one may potentially use the rig to take immediate actions.

2. Description of the Related Art

During completion of oil wells and the following clean-up during start up of oil wells, it is very important in an as early a stage as possible to have the control on effectiveness of the clean-up process. The costs of having a rig or a drilling vessel at location during this operation is very high, and may generally come to 363,720-606,200 USD per 24 hours. The clean-up process is successful if all completion fluids and particles as cuttings are out of the well and that the anticipated producing zones actually are producing, i.e. oil is flowing into the well in all zones or that it is reasonable to expect that all the zones will generate production.

Clean-up is defined as a process where completion fluids and particles are produced out.

The in-flow properties (skin) along the downhole target will change dramatically during this phase. The process may have several purposes, but the most important are:
a) as far as possible to prove that all completion fluid and particles are out
b) as far as possible to verify that the "mudcake" has been broken down, and that the well is flow connected to a desired degree to the reservoir
c) give an indication about the inflow profile To verify that the clean-up process has given a satisfactory result within a short time, gives the possibility to "release" the rig or the drilling ship at an as early as possible stage and secure that one may not have to carry out clean-up actions that is both time consuming and gives unnecessary high costs as a result, on a later stage.

A verification of the clean-up process may be performed by the use of chemical compounds as for instance substances that may be detected by use of spectroscopic methods such as UV, VIS, Fluorescence, and so on. It is known that produced oil contains different components that may cause interference with the tracers due to its own absorption maxima in the UV and VIS range. The detection methods of today are complicated and time consuming in proportion to the time pressure existing on releasing the rig.

WO2010005319A1 describes a tracer system wherein the tracer components comprise polyether alcohol or derivatives thereof.

These tracers are specially arranged to be detected in very low concentrations. The method for analysis is complex.

US 2006/0144588A1 discloses a portable arrangement for analysis of placed tracers of a certain concentration to an oil well. The analysis is quantitative with regards to concentration.

WO0181914A1 describes an intelligent release of tracers to decide where, i.e. in which zones, water, oil or gas flows into the production well, and for following use of that information to possible closing off zones, mapping of production rates or in other ways controlling hydrocarbons to give a more optimal reservoir exploitation over years.

The publication SPE 135070 "Using Chemical Tracers for Flow Profiling a Subsea Horizontal Well . . . " by Bakhshi et al. describes a study which includes placing different tracers in specific locations along the length of a lower completion. The tracers may be soluble in oil or water. Samples are taken at the surface during a short period of start up. The samples are analyzed to determine the presence of tracers. Based on the results and the known placed position qualitative information of the fluid flow in the well is generated. All analysis of tracers are carried out on shore.

The publication SPE "Parmanent Tracers Embedded in Downhole Polyners Prove Their Monitoring Capabilities . . . " by Fridtjof Nyhavn and Anne D Dyrli describes a well completion with placed tracers along the lower part of the completion. The tracers are designed to change behavior as a function of the surrounding environment. Released tracers are analyzed from samples taken topside and the concentration of the tracers gives information of the well flow. The tracers are soluble in oil. Sampling is carried out over an extended period and all the analyses are carried out on shore and are time consuming, up to a week.

The prior art describes methods of collecting well flow information by the use of different types of tracers. The analysis is time consuming and complex and performed in a separate laboratory mostly on shore. Since the day cost of having the completion rig at the well site is very high, reduction of the time of analyzing is essential.

US 2005/0109087 A1 describes methods and compositions for determining the source of fluids or particulates for subterranean formations and the tracer matrix that may be used within such methods. Different tracers are to be placed in different zones and the photoactive material used is detected in the return flow. Detection of tracers may be carried out by detection techniques that can measure the absorption or emission of light. Methods referred are by calorimeters, thin layer chromatography, gas chromatography, HPLC, UV-, VIS-, fluorescence- and mass-spectroscopy. Due to the fact that produced oil contains different components that may cause interference with the tracers due to its own absorption maxima in the UV and VIS range detection in oily samples may be difficult. This patent application describes the same technology and solution as WO0181914 A1 above, but has a more detailed description

SUMMARY OF THE INVENTION

The invention is a method for a rapid verification of satisfactory clean-up at the end of the completion process when starting production of petroleum fluids while the completion rig is still at the well location. In other words, the invention is a rapid-verification-of-satisfactory-clean-up method used at the end of the completion process when starting production of petroleum fluids while the completion rig is still at the well location. Stated more briefly, the method is an in situ clean-up verification method used at the end of the completion process when starting production of petroleum fluids while the completion rig is still at the well location.

The method comprises the following steps:

marking one or more of separated zones (S1, S2, S3, . . . ) along the well by one or more distinct tracers (T1O, T2O, T3O, . . . ), before starting the production,
wherein the tracers (T1O, T2O, T3O, . . . ) are added along with the completion or the clean-up fluid,
wherein the tracers (T1O, T2O, T3O, . . . ) are oleophilic,
wherein the tracers (T1O, T2O, T3O, . . . ) as such are optical detectable,
wherein the tracers (T1O, T2O, T3O, . . . ) are arranged for to be released from every each zone to an inflowing fluid of oil or gas,
starting up the production,
collecting at least one sample of the produced petroleum fluid,
processing the sample to change the tracers (T1O, T2O, T3O, . . . ) into nonoleophilic (oleophobic) tracers (T1w, T2W, T3w, . . . ),
separating the now non oleophilic tracers (T1w, T2W, T3w, . . . ) from the oil (O) in the sample,
optical inspection of the non oleophilic tracers (T1w, T2W, T3w, . . . ), to verify whether, or not, all of the tracers (T1w, T2W, T3w, . . . ) occur in the sample and with that in the produced petroleum fluids, or not, to verify if inflow of petroleum fluids in the tracer marked separated zones (S1, S2, S3, . . . ), takes place, or not, in the start-up phase of the production. This is to give a basis to validate if the petroleum well is satisfactory cleaned up and one then may initiate relocation of the drilling rig.

DETAILED DESCRIPTION OF THE INVENTION

A verification of the clean-up process may be performed by the use of chemical compounds as for instance substances that may be detected by use of spectroscopic methods such as UV, close to IR, Fluorescence, and the like. By the use of systems which leak high concentrations of dyes/tracers it is sufficient with low cost detection equipment that measure concentrations in a typical range 100 ppm-1 ppb.

A method according to the invention may shortly be described by that for instance different chemical substances/tracers (e.g. a number of 2-4) are placed out in the well by the use of the available completion solutions, and wherein the chemical substances/tracers are spread out from "heel" to "toe" (different zones). If all the chemical substances may be detected within the clean-up process, one may conclude that the process is good enough, and the rig may be relocated. Due to the fact that the produced oil contains components that may cause interference (have absorption maxima themselves) in UV and VIS range, the present invention comprises chemical compounds/substances that during installation (completion) are oil-soluble (leaking to into oil), but at the rig may be isolated from the oil phase by simple extraction using organic solvents, water based solutions or combinations thereof, in such a way that the solution will not be miscible with the oil phase, but forms an own phase or transfer into an added phase which is not miscible with the original oil phase (sample).

A solution to the problems mentioned above is a method for rapid verification of satisfactory clean-up at the end of the completion process when starting production of petroleum fluids while the completion rig is still at the well location comprising the following steps:

Firstly, marking one or more of separated zones (S1, S2, S3, . . . ) along the well by one or more distinct tracers (T1O, T2O, T3O, . . . ), before starting the production.

The tracers (T1O, T2O, T3O, . . . ) are added along with the completion or the clean-up fluid. The tracers (T1O, T2O, T3O, . . . ) are oleophilic. The tracers (T1O, T2O, T3O, . . . ) are optical detectable, or becomes so through chemical processes carried out after sampling but before the analysis/the detection takes place. The tracers (T1O, T2O, T3O, . . . ) are arranged for to be released from every each zone to an inflowing fluid of oil or gas. The first starting up of the production is then carried out. One accordingly collects at least one sample of the produced petroleum fluid. The tracers should be released in relatively high concentrations, preferably in the range of 1 ppb to 10 ppm.

The sample or samples are then processed to change the tracers (T1O, T2O, T3O, . . . ) into non oleophilic (oleophobic) tracers (T1w, T2W, T3w, . . . ), preferably into water-soluble tracers. Thereafter the now non oleophilic tracers (T1w, T2W, T3w, . . . ) separates from the oil (O) in the sample. An optical inspection of the non oleophilic tracers (T1w, T2W, T3w, . . . ) is then carried out, preferably in the water solution, to verify whether, or not, all of the tracers (T1w, T2W, T3w, . . . ) occur in the sample and with that in the produced petroleum fluids, or not. With that one may verify if inflow of petroleum fluids in the tracer marked separated zones (S1, S2, S3, . . . ), takes place, or not, in the start-up phase of the production. Thereby one may immediately tell if the petroleum well is satisfactory cleaned and that one may order rig-down and/or removal of the completion rig.

The chemical substances which are desired to be detected have to be of such a nature that they do extract from the oil phase into the above mentioned solvent/water phase under conditions that hinder natural oil components to be extracted into the particular phase in as large a scale as possible.

It is also possible to use water soluble tracers/substances which releases to a water based completion phase, and wherein these thereby easy separates from the presence of potential oil phases. The method for a rapid verification then comprises the following steps:

Firstly, marking one or more of separated zones (S1, S2, S3, . . . ) along the well by one or more distinct tracers (T1, T2, T3, . . . ), before starting the production.

The tracers (T1, T2, T3, . . . ) are added along with the completion or the clean-up fluid. The tracers (T1, T2, T3, . . . ) are optical detectable, or becomes so through chemical processes carried out after sampling but before the analysis/the detection takes place. The tracers (T1, T2, T3, . . . ) are arranged for to be released in relative high concentrations from every each zone to an inflowing fluid of oil or gas. The first starting up of the production is then carried out. Then, one accordingly collects at least one sample of the produced petroleum fluid. It is no need for extraction and the water phase can be analyzed. Thereafter an optical inspection of the tracers (T1, T2, T3, . . . ) is carried out, preferably in the water solution, to verify whether, or not, all of the tracers (T1, T2, T3, . . . ) occur in the sample and with that in the produced petroleum fluids, or not. With that one may verify if inflow of petroleum fluids in the tracer marked separated zones (S1, S2, S3, . . . ), takes place, or not, in the start-up phase of the production by use of the inspection method mentioned below where the water soluble tracers (T1w, T2w, . . . ) will be identical to the distinct tracers (T1, T2, . . . ) mentioned here.

The desired characteristics for the tracers according to the invention may be obtained by comprising chemical substances/compounds which is incorporated in an oil soluble form. This may be performed by chemical compounds comprising acidic functions (carboxylic acid, sulfonic acid or the like) or other functional groups that may be ionized under different conditions (amines etc.), incorporates while they are in a non ionized form (oil soluble). When they are to be extracted to water or an organic phase, one may manipulate the pH to give charged chemical compounds which, by that, will be transferred to the more polar phase. Detection of the dyes may then be carried out from these mentioned polar phases with little interference from the natural existing oil-soluble components that may cause interference. With other words one may say that during the extraction the tracers, which comprise chemicals, changes from being oil soluble to become water soluble in polar solvents.

In an embodiment of the invention the treatment of the sample comprise a chemical reaction classified as an acid-base equilibrium reaction that introduce water soluble groups in the tracer molecule structure.

In another embodiment of the invention the treatment of the sample comprise a chemical reaction classified as a cleavage reaction which introduces water soluble groups in the tracer molecule structure.

In another embodiment of the invention charged chemical substances with "hydrophobic" counter ions may be used, in a way that the molecules (complexes) overall becomes hydrophobic and thereby oil soluble. For instance in aqueous solutions the counter-ions will be exchanged by added hydrophilic counter-ions in the polar or water based solution through an extraction step. The dyes/tracers will then become soluble in the polar or water based solution.

In another embodiment of the invention one may use tracers which comprise chemical substances which are esterified (esters of carboxylic acid, sulfonic acid, phosphoric acid) or chemical substances comprising other chemical groups which are chemical modified (protected) by hydrophobic units, and wherein those units will split of under the extraction so as the dyes becomes water soluble or soluble in polar solvents. In an embodiment of the invention the optical inspection by the non oil soluble tracers (T1w, T2w, T3w, . . . ) is carried out by a spectral analysis for instance in UV-light or light in the visible light spectrum. Light close to IR may be used as well.

In an embodiment of the invention the detection of the different tracers will be carried out by the use of fluorescence, photoluminescence, laser induced fluorescence, or DOE (diffractive optical elements).

In an embodiment of the invention the separation and detection of the tracers will be carried out by thin layer chromatography (TLC, Thin Layer Chromatography) with following optical measurements.

In an embodiment of the invention the separation and detection of the tracers will be carried out by chromatography in micro channel flow system and following optical measurements.

Advantageous with TLC and micro channel systems are that they are well suited for optical measurements or inspections.

In an embodiment, if the tracers do not give the requisite response by UV or visible light, aerosol may be used to "develop" the tracers for to further visualizing by the use of e.g. UV, visible light or close to IR light.

Placement/Installation of Tracers

The tracers being used in the invention may be incorporated in a matrix (high content of tracing material) which is placed as a part of a sand screen or another part of a well completion. Release of the tracers takes place through different events as dissolving of matrix comprising tracers comprising chemical substances/tracer materials, by swelling of the matrix or by a protection casing/container comprising tracer, is perforated or destroyed by the means of controlled incident (i.e. physical shooting of holes), solvents etc.).

Another possibility is to insert (fill up) highly concentrated solutions of chemical compounds in a cavity that is a part of the mechanical completion. Release of tracers may then be carried out by shooting holes in (perforate) the particular completion zone or to use valves of different types (manual controlled or wireless).

The invention claimed is:

1. An in situ clean-up verification method for use at a well location having a well at an end of a well drilling completion process, when starting production of petroleum fluids while a completion rig is still at the well location, the verification method comprising the following steps:
   marking one or more separated zones along the well with one or more distinct tracers before starting the production of petroleum fluids,
   wherein said distinct tracers are added along with a completion system,
   said distinct tracers are oleophilic,
   said distinct tracers are optically detectable, and
   said distinct tracers are arranged so that they are released from each separated zone to an inflowing fluid of oil or gas;
   starting up the production of petroleum fluids;
   collecting at least one sample of a produced petroleum fluid;
   processing the at least one sample by a chemical cleavage reaction which introduces water soluble groups to tracer molecule structures to change said distinct tracers into non oleophilic tracers, thereby achieving at least one processed sample,
   wherein said non oleophilic tracers are dissolvable in a polar fluid,
   transferring said non oleophilic tracers from an oil in the at least one processed sample into an added, polar fluid phase, which is not miscible with an original oil phase of the at least one processed sample; and
   optically inspecting the added fluid phase for non oleophilic tracers to verify whether or not all of said non oleophilic tracers occur in the at least one processed sample of the produced petroleum, which thus verifies if inflow of petroleum fluids in said tracer marked separated zones takes place or not, in a start-up phase of the production.

2. The method according to claim 1, wherein the optical inspection of said non oleophilic tracers is carried out by spectral analysis in UV-light or light in a visible light specter.

3. The method according to claim 1, wherein detection of said non oleophilic tracers is carried out by the use of fluorescence, photoluminescence, laser induced fluorescence, or diffractive optical elements (DOE).

4. The method according to claim 1, wherein separation and detection of said non oleophilic tracers are carried out by thin layer chromatography (TLC) and following optical measurements.

5. The method according to claim 1, wherein separation and detection of said non oleophilic tracers are carried out by chromatography in micro channel flow system and following optical measurements.

6. The method according to claim 1, wherein said distinct tracers are arranged to be released in high concentrations in a range of 1 ppb to 10 ppm.

7. An in situ clean-up verification method for use at a well location having a well at an end of a well drilling completion process, when starting production of petroleum fluids while a completion rig is still at the well location, the verification method comprising the following steps:

marking one or more separated zones along the well with one or more distinct tracers before starting the production of petroleum fluids,
   wherein said distinct tracers are added along with a completion system,
   said distinct tracers are oleophilic,
   said distinct tracers are optically detectable, and
   said distinct tracers are arranged so that they are released from each separated zone to an inflowing fluid of oil or gas;
starting up the production of petroleum fluids;
collecting at least one sample of a produced petroleum fluid;
processing the at least one sample by a phase transfer reaction wherein oleophilic tracers having hydrophobic counter-ions become water soluble by exchanging the hydrophobic counter-ions with hydrophilic counter-ions added through a water-based liquid during extraction to change said distinct tracers into non oleophilic tracers, thereby achieving at least one processed sample,
   wherein said non oleophilic tracers are dissolvable in a polar fluid,
transferring said non oleophilic tracers from an oil in the at least one processed sample into an added water based fluid phase; and
optically inspecting the added fluid phase for non oleophilic tracers to verify whether or not all of said non oleophilic tracers occur in the at least one processed sample of the produced petroleum, which thus verifies if inflow of petroleum fluids in said tracer marked separated zones takes place or not, in a start-up phase of the production.

8. The method according to claim 7, wherein the optical inspection of said non oleophilic tracers is carried out by spectral analysis in UV-light or light in a visible light specter.

9. The method according to claim 7, wherein detection of said non oleophilic tracers is carried out by the use of fluorescence, photoluminescence, laser induced fluorescence, or diffractive optical elements (DOE).

10. The method according to claim 7, wherein separation and detection of said non oleophilic tracers are carried out by thin layer chromatography (TLC) and following optical measurements.

11. The method according to claim 7, wherein separation and detection of said non oleophilic tracers are carried out by chromatography in micro channel flow system and following optical measurements.

12. The method according to claim 7, wherein said distinct tracers are arranged to be released in high concentrations in a range of 1 ppb to 10 ppm.

* * * * *